UNITED STATES PATENT OFFICE.

CARL SORGER, OF NIEDERLAHNSTEIN, GERMANY.

ACID FERRIC ARSEN-TARTRATE.

995,383.  Specification of Letters Patent.  Patented June 13, 1911.

No Drawing. Original application filed September 3, 1908, Serial No. 451,587. Divided and this application filed June 6, 1910. Serial No. 565,392.

*To all whom it may concern:*

Be it known that I, CARL SORGER, doctor of philosophy, a subject of the King of Prussia, residing at Niederlahnstein-on-the-Rhine, (formerly at Frankfort-on-the-Main,) Germany, have invented a certain new and useful Process of Manufacturing Acid Ferric Arsen-Tartrate, of which the following is a specification.

Just as the iron salts of phosphoric acids, which are insoluble in water, the insoluble iron salts of the arsenic acid can be dissolved by so-called vegetable acids such as tartaric acid. From these solutions the acid iron salts of the complex arsen-tartaric acid can be precipitated by neutralizing the excess of acid with alkalis. A better manner of producing the ferric arsen-tartrate is, to precipitate the solution of sodium arsen-tartrate by chlorid of iron, $Fe_2Cl_6$.

The properties of this new ferric arsen-tartrate salt resemble very much those of the ferric phosphor-tartrate.

Example I: By treating two molecular proportions of ferric arseniate, $FeAsO_4$ (which is obtained by treating 411 parts of disodium arseniate, $Na_2HAsO_4$, with 270 parts of iron chlorid, $Fe_2Cl_6$) with three molecular proportions of acid tartaric sodium, $C_4H_5O_6Na$, (obtained from 220 parts of tartaric acid, $C_4H_6O_6$, and 85 parts of sodium carbonate, $Na_2CO_3$), the yellow ferric arseniate is made liquid and changes to a green matter of the ferric arsen-tartrate, which forms a yellowish-green powder after having been washed in water, pressed and dried in the dark.

Example II: On treating the solution of 411 parts of disodium arseniate $$(Na_2HAsO_4)$$

dissolved in 1000 parts of water, with 220 parts of tartaric acid $(C_4H_6O_6)$ and 85 parts of carbonate of sodium $(Na_2CO_3)$, the same being heated and stirred, and on mixing this solution containing soluble disodium arsen-tartrate with a solution of 270 parts of iron chlorid $(Fe_2Cl_6)$ dissolved in 500 parts of water, the yellowish-green, acid ferric arsen-tartrate is precipitated at once and can be separated as described above.

Claim:

A process for manufacturing acid ferric arsen-tartrate, consisting in, (1) treating ferric arseniate $(FeAsO_4)$ with acid sodium tartrate $(C_4H_5O_6Na)$ in the ratio of 2 molecules of the former to 3 of the latter, and (2) treating the obtained solution of the alkali arsen-tartrate with chlorid of iron $(Fe_2Cl_6)$.

CARL SORGER.

Witnesses:
 CARL GRUND,
 JEAN GRUND.

Copies of this patent may be obtained for five cents each, by addressing the "Commissioner of Patents, Washington, D. C."